Patented Mar. 12, 1929.

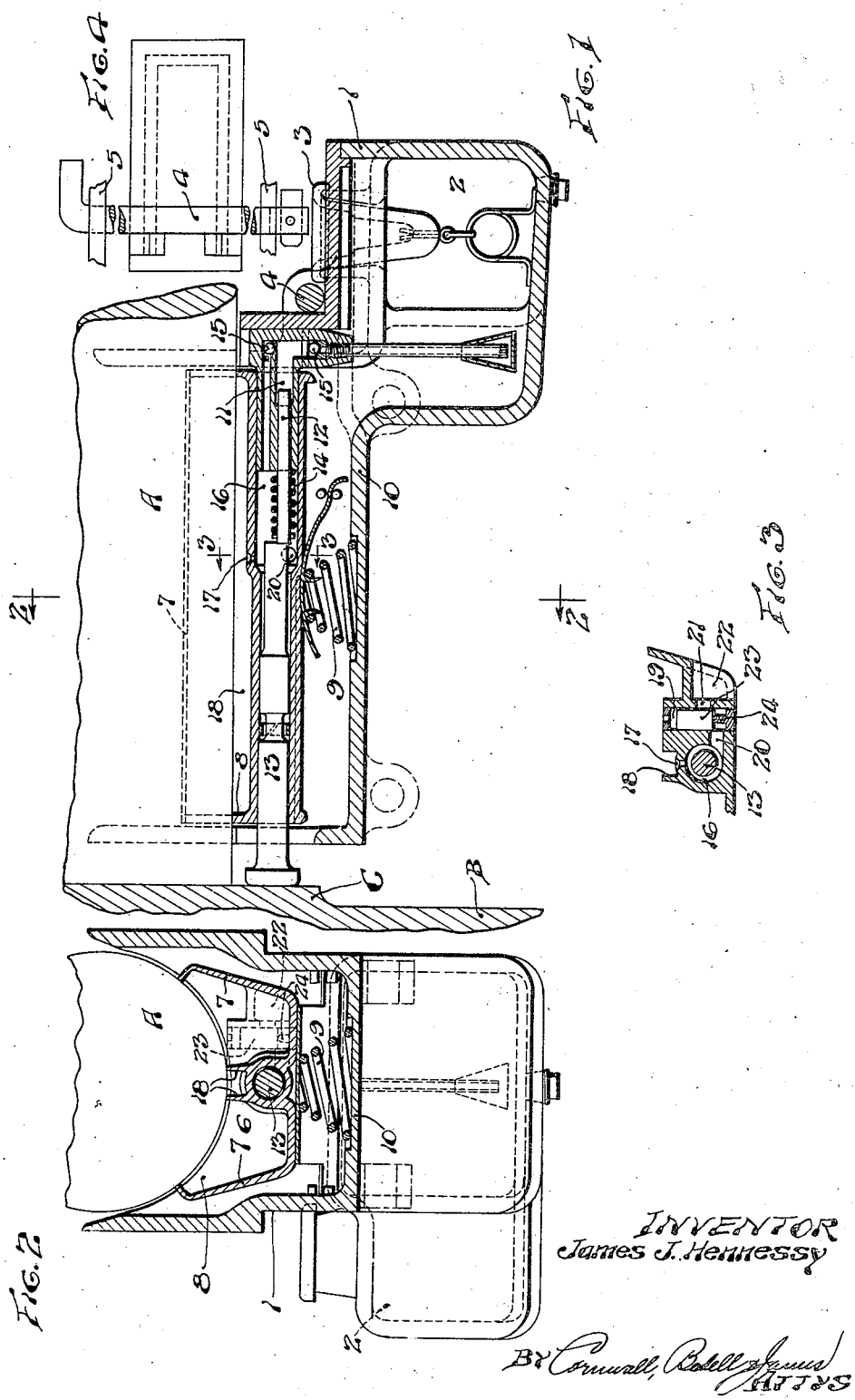

1,704,742

UNITED STATES PATENT OFFICE.

JAMES J. HENNESSY, OF NEW YORK, N. Y.

LUBRICATOR.

Application filed May 8, 1926. Serial No. 107,654.

My invention relates to lubricators particularly adapted for use in connection with the journals of railway rolling stock. Various forms of such lubricators are shown in my copending applications, Serial No. 668,996, filed October 17, 1923, Serial No. 742,253, filed October 7, 1924, and Serial No. 55,603, filed September 10, 1925.

My present invention consists in improvements and modifications in the structures described in the above-mentioned applications, the object of my present invention being to provide a more efficient and durable lubricating device for the intended purpose.

Lubricators of the type referred to include a pump which is operated by the relative movement of the journal in the journal box, or driving box, the pump including a contact element which is moved in one direction by the journal wheel, or other journal element, and is moved in the opposite direction by a spring or weight when the axle and wheels again shift. It is necessary to provide a pump, the capacity of which will be sufficient to adequately lubricate the journal when the reciprocal movement of the axle is small. The pump must have enough force to handle heavy oils at low temperatures and the pump must maintain an adequate supply of lubricant to the journal under both of the above conditions when the rolling stock is traveling at low speeds and on a track which is in first class condition, that is, will produce a minimum amount of reciprocal movement of the axle. The device must be simple and should be adapted to be inserted in a standard box without requiring any machining of the latter.

Obviously, a pump designed to supply the necessary amount of lubricant to the journal under any or all of the above unfavorable conditions will supply a much larger amount of lubricant than is necessary or desirable under more favorable pumping conditions; for instance, when the viscosity of the oil is small, the atmospheric temperature high, the reciprocal movements of the axle frequent, and the extent of such movements increased by wear on the journal pedestals, collars, etc. Unless some means is provided for taking care of surplus lubricant discharged by the pump, the waste-packed sub-cellar usually provided in these lubricators will be flooded and the lubricant excluded between the walls of the sub-cellar and the journal and waste. Surplus lubricant will be carried by the journal beyond the sub-cellar walls and will be discharged centrifugally when the journal surface rotates at high speeds. This is particularly true when the device is applied to the journals of wheels of small diameter, such as the pony or trailer wheels of a locomotive.

In my present invention I provide a simple means of by-passing any surplus oil back to the reservoir from which the pump elevates the oil, the by-pass being located adjacent to the part of the oil delivery passageway which is most responsive to the surplus lubricant condition.

In the drawings illustrating my invention—

Figure 1 is a longitudinal vertical section through my improved lubricator, showing the same in contact with the journal to be lubricated and indicating the adjacent portion of the journal wheel.

Figure 2 is a vertical transverse section taken on line 2—2 of Figure 1.

Figure 3 is a similar section of a detail taken on line 3—3 of Figure 1.

Figure 4 is a top view of a detail showing the method of securing the lubricator in the journal box.

The journal to be lubricated is indicated at A and the outer face of the wheel mounted on the journal is indicated at B, the wheel hub being shown at C. The body 1 of the lubricator includes a lubricant reservoir 2 adapted to be filled manually by removal of the cap 3 at intervals. The body 1 is insertable in a driving box and may be held in position by a pin 4 which will pass through suitable elements 5 in the journal box.

The lubricator also includes a sub-cellar 6 having side walls 7 and end walls 8 adapted to contact with the surface of journal A, the sub-cellar being yieldingly supported in journal contacting position by means of a spring 9 mounted on the elevated bottom 10 of the body.

The lubricator also includes a pump comprising a cylinder 11, formed in the sub-cellar, and a piston 12 reciprocated in cylinder 11 by a contact rod 13 and a coil spring 14, the pumping mechanism including ball check valves 15 whereby liquid sucked up into the cylinder 11 on the outstroke of the piston 12 is forced upwardly into the passage 16 leading through opening 17 into the conduit 18 which delivers the lubricant to the journal surface.

This conduit is in the form of a shallow trough extending substantially throughout the length of the journal and having upstanding walls adapted to contact with the journal. The sub-cellar and trough are shown as formed integrally and the upper edges of the sub-cellar and the trough walls will be machined to fit against the particular size of journal for which the device is intended and the edges of these walls will soon wear into close contact with the journal surface.

It will be understood that the sub-cellar outside of trough 18 is to be packed with cotton waste, whereby the lubricant will be evenly distributed throughout the journal surface.

A small upright chamber 19 is formed at one side of the passage 16 and trough 18 and this chamber has on one side a permanently open connection 20 to passage 16. The opposite side of the chamber has a connection 21 to a recess 22 in the lower corner of a sub-cellar, the outer end of which recess is open to the lubricant reservoir. A plunger 23 slidably mounted in chamber 19 normally covers connection 21, thereby closing the chamber from the reservoir. A rib 24 supports plunger 23 in an elevated position so that it can not close connection 20 between the chamber 19 and the passage 16.

When the pump is operating and has filled conduit 18, any further discharge of lubricant to the conduit will create sufficient pressure to lift plunger 23 and uncover connection 21, thus permitting the surplus lubricant to flow back into the reservoir.

It will be noted that connections 20 and 21 are substantially larger than openings 17 and correspond in their cross sectional area to the more restricted portion of passage 16 so that when connection 21 is open the by-pass formed by the elements 19, 20, 21, and 22 may operate freely and without any substantial increase in the pressure of the lubricant in trough 18. Obviously, plunger 23 may be increased or decreased in weight to provide any desired pressure in trough 18. There is a relation between the weight of plunger 23 and the strength of spring 9. It is my intention that the latter would be strong enough to maintain contact between the conduit and sub-cellar walls and the journal throughout any variations in pressure on the lubricant in conduit 18.

The above-described structure secures the general objects set forth at the beginning of my specification and has the additional advantage of providing a substantial flow of lubricant through the more restricted portions of the passageway leading from the reservoir to the journal feeding conduits and is very effective in flushing any sediment or dirt which would otherwise tend to be deposited along the passageway. This avoids the need for a fine mesh screen which must be inspected and cleaned at intervals. I find that I need not use any screen but, if it is desired to install one, the same requires much less attention than heretofore.

I claim:

1. In a lubricator, a pump, a sub-cellar, a lubricant conduit in said sub-cellar for delivering lubricant to the journal to be lubricated, a passage leading to said conduit and a by-pass from said passage operative only upon the accumulation of a predetermined amount of lubricant in said passage.

2. In a lubricator, a lubricant reservoir, a pump, a sub-cellar, a lubricant conduit in said sub-cellar for delivering lubricant to the journal to be lubricated, a passage leading to said conduit, a by-pass from said passage to said reservoir, an element normally closing said by-pass but adapted to be moved by lubricant to open said by-pass when the pressure in said passage reaches a predetermined point.

3. In a lubricator, a lubricant reservoir, a pump, a sub-cellar, a lubricant conduit in said sub-cellar for delivering lubricant to the journal to be lubricated, a passage leading to said conduit, a vertical chamber adjacent said passage with its lower part connected thereto, a connection from said chamber above the bottom thereof to said reservoir, a plunger in said chamber adapted when in the lower part of said chamber to close said connection and when elevated in said chamber to open said connection.

4. In a journal lubricator, a waste holding sub-cellar having widely spaced sides and ends for contacting with a journal to be lubricated and adapted to contain waste and lubricant within said walls, a relatively narrow longitudinal lubricant conduit in said sub-cellar having side and end walls adapted to contact with said journal and to exclude waste from the area between them, and means for pumping lubricant to said conduit.

5. In a journal lubricator, a waste holding sub-cellar having widely spaced sides and ends for contacting with a journal to be lubricated and adapted to contain waste and lubricant within said walls, a relatively narrow longitudinal lubricant conduit in said sub-cellar having side and end walls adapted to contact with said journal and to exclude waste from the area between them, means for pumping lubricant to said conduit, and automatic means for relieving said conduit of surplus lubricant without interfering with said pumping means.

6. In a journal lubricator, a lubricant reservoir, a pump connected thereto and positively actuated by relative movement of an axle to be lubricated and its box, a lubricant distributing conduit, a passage from said pump to said conduit, and means for limiting the pressure on lubricant supplied to said passage by said pump irrespective of the extent of said relative movement.

7. In a journal lubricator, a sub-cellar adapted to fit against the surface of a journal to be lubricated, a spring for holding said sub-cellar against said journal, a lubricant conduit in said sub-cellar, a passage leading thereto a pump positively operated by relative movement of said lubricator and the journal to be lubricated for forcing lubricant through said passage and into contact with said journal, and means for limiting the pressure on lubricant in said passage to a less degree than the pressure holding said sub-cellar against the journal irrespective of such relative movement.

8. In a lubricator, a lubricant reservoir, a waste containing pan-like member with its walls shaped to contact with a journal to be lubricated, an elevated horizontal conduit in said member for delivering lubricant to said journal, a passage from said reservoir to said container, a by-pass from said passage leading through the wall of said member to said reservoir, and means for automatically opening said by-pass when a predetermined pressure is reached in said passage.

9. In a pan-like member for a journal lubricator, a waste receptacle for distributing lubricant to the journal to be lubricated, a horizontal conduit for containing lubricant, a supply passage below and leading to said conduit, a vertical chamber at one side of said passage and connected at its lower end to said passage and having a by-pass outlet above its lower end, and a plunger slidable in said chamber to cover and uncover said outlet.

In testimony whereof I hereunto affix my signature this 3rd day of May, 1926.

JAMES J. HENNESSY.